United States Patent [19]

Kirsch

[11] 4,107,541
[45] Aug. 15, 1978

[54] WORKPIECE HOLE PRESENCE AND ABSENCE INSPECTOR

[76] Inventor: Jerry Kirsch, 36 Beacon Hill, Grosse Pointe Farms, Mich. 48236

[21] Appl. No.: 774,601

[22] Filed: Mar. 4, 1977

[51] Int. Cl.² .............................................. G11B 1/00
[52] U.S. Cl. ................................... 250/571; 356/237
[58] Field of Search .............. 250/559, 563, 571, 572, 250/237 R; 356/156, 200, 237, 239

[56] References Cited

U.S. PATENT DOCUMENTS 3,785,738  1/1974  Hoppke ............................ 250/572 X Primary Examiner—James B. Mullins
Attorney, Agent, or Firm—Willis Bugbee

[57] ABSTRACT

To determine whether or not all of the required holes have been formed in a multiple-hole workpiece, as by a punch press, the workpiece is placed in an inspection arrangement containing a system of multiple mirrors adapted to reflect a laser beam from a laser beam source through the multiple holes in the workpiece to a laser beam sensor which preferably is electrically connected to an acceptance or rejection indicator or actuator or to the press control system. If all of the holes have been properly punched or otherwise formed, the sensor recognizes that fact and permits the next workpiece to be fed to the press and the inspected workpiece to be conveyed onward as accepted. If, on the other hand, one or more of the holes have not been punched or otherwise formed, the passage of the laser beam is blocked, so that the workpiece is rejected by the sensor and its connected workpiece handling system, and at the same time, the press control system halts the press and prevents the workpiece handling mechanism from supplying another workpiece to the press until the rejection has been overcome. In a modification, the inspector is built into the press equipment itself, whereby the upper and lower dies of the press are provided with the laser beam source and sensors, also with passageways containing the multiple mirrors, and operating similarly as above described. The lower die is also provided with scrap slug disposal passageways for carrying away the slugs punched out of the workpiece placed between the upper and lower dies.

10 Claims, 3 Drawing Figures

U.S. Patent
Aug. 15, 1978
4,107,541
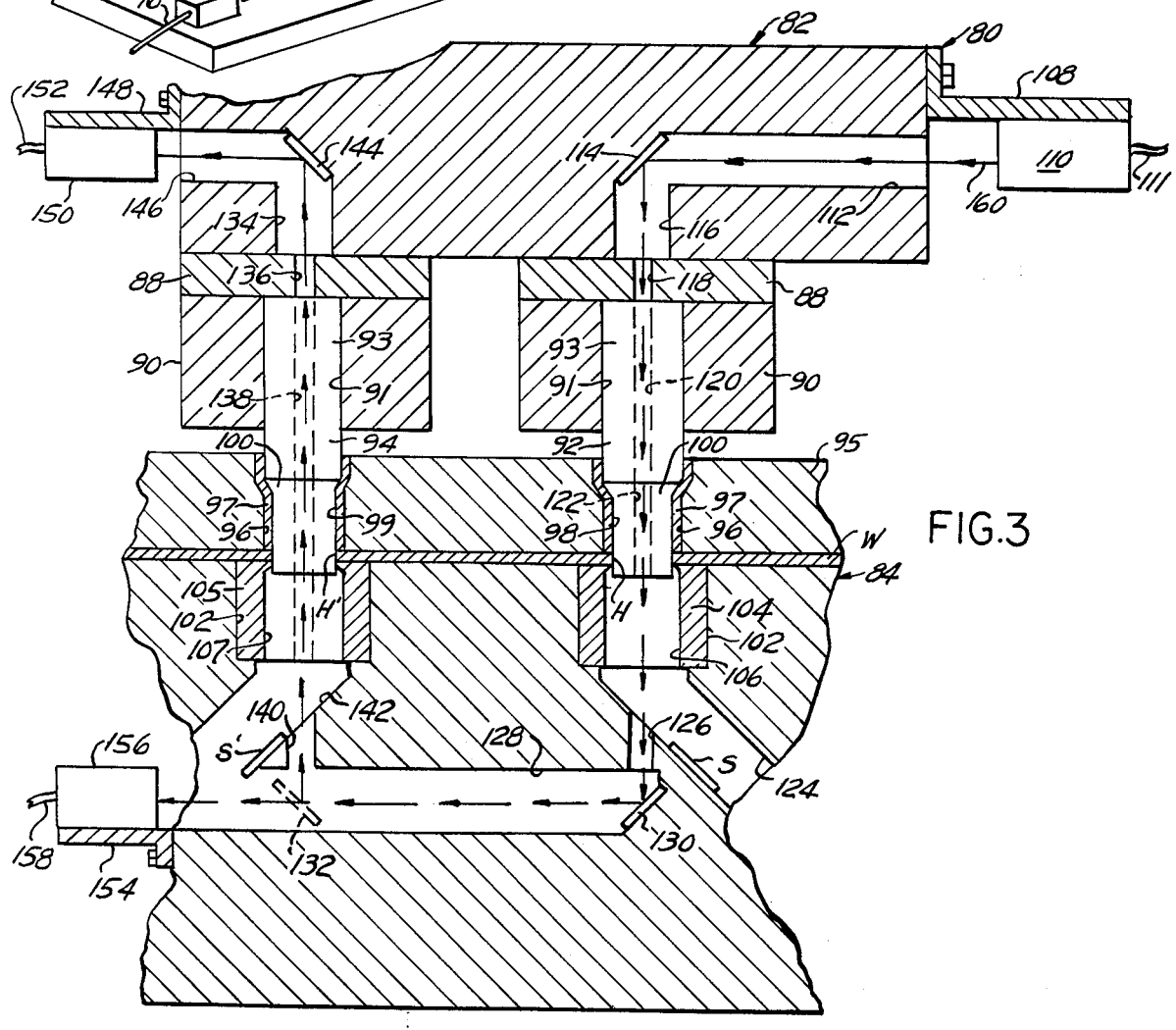

WORKPIECE HOLE PRESENCE AND ABSENCE INSPECTOR

Summary of the Invention

The invention principally resides in the system of reflectors receiving the incident portion of the the laser beam from the laser beam source and transmitting it through the various holes in the workpiece to the laser beam sensor which in response to the reception or non-reception of an emergent laser beam portion communicates to the press control system whether or not all of the required holes have been formed in the workpiece and controls the press and workpiece feeding thereto accordingly. A modification makes the upper and lower dies of the punch press serve as the fixture by providing them with passageways through which the laser beams pass and are reflected by mirrors therein, the beam being transmitted through passageways in the punch or punches to the laser beam sensor and thence to the press control system, as above stated.

In the drawing,

FIG. 1 is a diagrammatic perspective view of a workpiece hole presence and absence inspector, according to one form of the invention;

FIG. 2 is a top plan view of the optical system of the inspector shown in FIG. 1 with the laser beam source omitted; and FIG. 3 is a central vertical section through the upper and lower dies of a punch press wherein the hole presence or absence inspector system is built into the dies and press itself.

Referring to the drawing in detail FIG. 1 shows a workpiece hole presence and absence inspector, generally designated 10, according to one form of the invention, as mounted on the base plate 12 of a suitable supporting structure, generally designated 11, which includes an upstanding angle bracket 14. Secured to the bracket 14 is a vertically-disposed conventional laser beam source 16 which projects the incident portion 15 of a laser beam, generally designated 18, downward through a workpiece 20 by way of a hole 22 in an inclined wall 24 of an enlargement 26 at one end of an elongated portion 28 of channel cross-section. Mounted on the top surface 30 of the base plate 12 immediately below the hole 22 and in line with the laser beam 18 is a mirror 32 disposed at an angle of 45° to the top surface 30.

In addition to the inclined wall 24, the workpiece 20 in its elongated channel-shaped portion 28 has a top wall 34 and opposite side walls 36 and 38 disposed in spaced parallel relationship and defining a passageway 39 through the workpiece 20. By way of example, the side wall 38 of the workpiece 20 is assumed to be provided with longitudinally-spaced holes 40, 42, and 44. It will be understood, however, that the opposite side wall 36 or the top wall 34 may be provided with either additional holes or alternative holes (not shown), wherein the same principles of the invention apply but with a suitably modified optical system of reflectors such as mirrors or prisms or optical fiber cables.

For guiding the laser beam 18, which is also the optical axis of the optical system, generally designated 46, (FIGS. 1 and 2), mirrors 48, 50, 52, 54, 56, and 58, in addition to the mirror 32, are mounted on the upper surface 30 of the base plate 12. The mirrors 48, 54, and 56 in the arrangement shown in FIG. 1 are suitably mounted in the workpiece passageway 39 at angles of 45° degrees to the horizontal axis of the elongated workpiece portion 28 adjacent the holes 40, 42, and 44, whereas the mirrors 50, 52, and 58 are disposed in spaced parallel relationship to their respective associated mirrors 48, 54, and 56, and being likewise disposed at angles of 45° relatively to the longitudinal axis of the elongated portion 28 of the workpiece 20. Thus, the incident portion 15 of the laser beam 18 is reflected by the mirror 32 into the first reflected beam portion 62, thence by the mirror 50 to a third reflected beam portion 64, thence by the mirror 52 to a fourth reflected beam portion 66, thence by the mirror 54 to a fifth reflected beam portion 68, thence by the mirror 56 to a sixth reflected portion 70, and finally by the mirror 58 to a seventh reflected portion 72 which passes into a conventional laser beam sensor 74 by way of a lens therein (not shown). From the laser beam sensor 74 an electrical conductor cable 76 runs to the press control or workpiecefeeding system (not shown) or to an inspection acceptance or rejection indicator (also not shown).

In the operation of the invention, let it be assumed that the workpiece 20 has been suitably positioned upon the upper surface 30 of the base plate 12 in a definite location determined by suitable stops (not shown) so that its previously-formed holes 22, 40, 42, and 44 are suitably aligned with the respective mirrors of the optical system 46, with the result that the laser beam 18 will pass through these various holes, to the sensor 74. With the workpiece 20 thus positioned, the laser beam source 16 is energized through the cable 78, whereupon it projects the incident portion 15 of its beam 18 downward upon the workpiece inclined surface 24. If all of the holes 22, 40, 42, and 44 have been formed in the workpiece 20, the incident portion 15 of the laser beam 18 and its various successive reflected portions 60, 62, 64, 66, 68, 70, and 72 pass unobstructed to the sensor 74. The latter conveys this information in an emitted signal or signals through the cable 76 to the control system (not shown) of the punch press or other controlled machine which is thereupon permitted to proceed with its regular operation. If on the other hand, one or more of the above-named holes has not been formed, as by the breaking off or malfunctioning of a punch, the solid wall 38 where the non-formed hole would otherwise be located, obstructs the laser beam 18 so that it does not reach the sensor 74, with the result that a corresponding signal to that effect is emitted by the sensor 74 and conveyed through the cable 76 to the press control system (not shown), which thereupon halts the press and prevents it from proceeding as well as halting the workpiece feeding mechanism which would otherwise feed the next unprocessed workpiece to the press.

In the modified workpiece hole presence and absence inspector, generally designated 80, shown in FIG. 3, the inspecting arrangement and optical system are built into the upper and lower dies, generally designated 82 and 84 respectively, of a conventional stamping press or punch press (not shown). Bolted or otherwise attached to the upper die 84 by plates 88 and blocks 90 with bores 91 are the shanks 93 of a plurality of punches 92 and 94 which punch spaced holes H and H' in a workpiece W through a holddown pad 95. The latter is provided with correspondingly-spaced flared bores 96 and flared bushings 97 containing bores 98 and 99 mating with the reduced diameter nose or working portions 100 of the punches 92 and 94. The lower die 84 is provided with laterally-spaced bores 102 within which are seated die sleeves 104 and 105 provided with central bores 106 and 107 aligned with and telescoping with the nose or working portions 100 of the punches 92. Thus, the bores 106 are coaxial with the bushing bores 98 and 99, punch nose portions 100 and punch shanks 93.

Bolted or otherwise secured to the upper die 82 is an angle bracket 108 on the under side of which is mounted a laser beam source 110 with an input conductor cable 111. The source 110 is coaxial with a horizontal entrance which is a passageway 112 communicating at right angles by way of a 45° mirror 114 with a plurality of coaxial vertical passageways 116, 118, 120, and 122 which in turn are coaxial with the bore 106. Below the bore 106 is an inclined slug or scrap passageway 124 from which a vertical passageway 126 coaxial with the vertical passageways 118, 120, 122, and 106 proceeds downward to a horizontal passageway 128. Mounted immediately below the passageway 126 is a 45° mirror 130. Mounted in the passageway 128 immediately below and aligned with the bores 99 and 107 is a semi-reflecting 45° mirror 132 which in turn is aligned with vertical passageways 134 in the upper die 82, 136 in the plate 88, 138 in the punch 94, 99 in the bushing 97, 107 in the die sleeve 105, and with a vertical passageway 140 extending downward from an inclined slug or scrap passageway 142 similar to the inclined passageway 124 for carrying away the slugs S punched out of the holes H and H' in the workpiece W. Mounted at the top of the uppermost vertical passageway 134 is a 45° mirror 144 at the junction of the passageway 134 and a horizontal passageway 146.

Mounted on the upper die 82 as by a bracket 148 bolted or otherwise secured thereto is an upper laser beam detector or sensor 150 from which a conductor cable 152 leads to a conventional press control circuit (not shown). Similarly mounted on a bracket 154 bolted or otherwise secured to the lower die 84 is a lower laser beam detector or sensor 156 from which a conductor cable 158 leads to the conventional press control and/or workpiece feeding control circuit (not shown). The above-described arrangement is optically such that a laser beam 160 emerging from the laser beam source 110 is reflected at right angles downward by the upper mirror 114 through the passageways 116, 118, 120, 98, 106, and 126 to the lower mirror 130, thence horizontally along the passageway 128 to the loweer mirror 132. Here a portion of the beam is transmitted through the semi-reflecting mirror 132 to the lower laser beam detector or sensor 156, whereas the remainder thereof is reflected upward through the passageways 140, 107, 99, and 136, where it is reflected by the upper mirror 144 through the horizontal passageway 146 into the upper laser beam detector or sensor 150.

In the operation of the modified workpiece hole presence and absence detector 80, with the laser beam source 110 emitting a laser beam 160, the upper die 82 with its punches 92 and 94 is caused to descend into the position shown in FIG. 2, thereby punching out slugs S, S' from the workpiece W by the cooperation of the punches 92 and 94 with the die sleeves 104 and 105. The slugs S and S' pass downward through the bores 106 and 107 and inclined passageways 124 and 142 into places of disposal (not shown). When this occurs, the laser beam 160, pursuing the optical path described immediately above, passes downward into and along the horizontal passageway 128, whence the portion transmitted through the semi-reflecting mirror 132 enters the lower laser beam detector or sensor 156 from which the lower conductor cable 158 conveys to the press control and/or workpiece feeding control circuit the signal that the hole H has been successfully punched in the workpiece W. At substantially the same time, the remaining portion of the laser beam 160 reflected upward through the passageway 140 and bores 107, 99, 138, 136, and 134 is reflected by the mirror 144 along the upper horizontal passageway 146 into the upper laser beam detector or sensor 150, whence the upper conductor cable 152 conveys to the press control and/or workpiece feeding control circuit the signal that the hole H' in the workpiece W has also been successfully punched. The press and the associated ejector mechanism and subsequently the workpiece feeding or supply mechanism are then permitted to operate and carry out another cycle of punching operations.

If, on the other hand, one of the holes H or H' fails to be punched, such as by the breakage of the nose portion 100 thereof or by a failure of the upper die 82 to descend properly the required distance, the blocking, by the unpunched portion of the workpiece W, which would otherwise become one of the holes H or H', blocks the further passage of the laser beam 160. The result follows that the laser beam 160 does not reach either or both of the laser beam detectors or sensors 150 and 156, whereupon the signal that the hole H or H' or both holes H and H' have been punched does not reach either or both of the laser beam detectors or sensors 146 or 140. As a result, the press control circuit and/or the workpiece feeding control circuit accordingly refuses to permit operation of the press and/or the workpiece feeding mechanism until the defect is corrected.

I claim:

1. A laser-operated hole presence and absence inspector for a workpiece containing multiple intendedly-formed spaced holes therethrough as produced by a hole-forming machine, said inspector comprising laser inspector supporting structure having a workpiece rest thereon, a laser beam source mounted on said supporting structure, a laser beam transmitting and reflecting system disposed adjacent and in alignment with the intended locations of the holes in the workpiece and including a multiplicity of laser beam reflectors and passageway means therebetween constructed and arranged to reflect a multiplicity of laser beam portions along an optical path having corresponding portions disposed angularly relatively to one another, said reflectors being positioned to reflect said laser beam portions through the workpiece holes and from hole to hole thereof and to emerge from the final hole in said optical path, a laser beam sensor disposed in alignment with the emergent portion of said laser beam from said final hole and responsive to its detection of said emergent portion of said laser beam for indicating an all hole formation in the workpiece and responsive to the non-detection of said emergent portion of said laser beam for indicating the blocking thereof by the non-formation of at least one of said holes.

2. A laser-operated hole presence and absence inspector, according to claim 1, wherein said supporting structure is disposed in spaced relationship to the hole-forming machine.

3. A laser-operated hole presence and absence inspector, according to claim 2, wherein certain of said reflectors are disposed inside the workpiece.

4. A laser-operated hole presence and absence inspector for a workpiece containing a plurality of intendedly-formed laterally-spaced holes therethrough adapted to be produced in a hole-forming machine consisting of a punch press, said inspector comprising upper and lower die assemblies adapted to be relatively movably mounted in the punch press, one of said die assemblies including a plurality of punches spaced laterally apart from one another in accordance with the workpiece hole spacing and the other of said die assemblies having a plurality of correspondingly-spaced die apertures cooperably aligned with said punches, a laser beam source mounted adjacent one of said die assemblies, a laser beam transmitting and reflecting system disposed in said die assemblies adjacent an in alignnment with the intended locations of the holes in the workpiece and including a multiplicity of laser beam reflectors and passageway means therebetween constructed and arranged to reflect a multiplicity of laser beam portions along a plurality of optical paths through the workpiece holes and punches and having corresponding portions disposed angularly relatively to one another and including a plurality of emergent passageway portions, said reflectors being positioned in said passageways to reflect said laser beam portions through the workpiece holes and from hole to hole thereof and to emerge from said emergent passageway portions in said optical paths, a laser beam sensor disposed in alignment with the emergent portion of said laser beam from each of said emergent passageway portions and responsive to their detection of said emergent portions of said laser beam for indicating an all hole formulation in the workpiece and responsive to the non-detection of said emergent portions of said laser beam for indicating the blocking thereof by the non-formation of at least one of said holes.

5. A laser-operated presence and absence inspector, according to claim 4, wherein said laser beam source is mounted on one of said die assemblies, and wherein each laser beam sensor is disposed adjacent one of said die assemblies.

6. A laser-operated hole presence and absence inspector, according to claim 4, wherein said upper and lower die assemblies contain a plurality of horizontally-spaced vertical laser beam passageways, and wherein said reflectors are arranged in a plurality of sets thereof with one set of reflectors disposed in each such passageway.

7. A laser-operated hole presence and absence inspector, according to claim 6, wherein said laser beam source is disposed in communication with one of said vertical passageways, wherein a horizontal passageway interconnects said vertical passageways, and wherein one of said laser beam sensors is disposed in alignment with said horizontal passageway.

8. A laser-operated hole presence and absence inspector, according to claim 4, wherein one of said die assemblies is movable and the other of said die assemblies is stationary, wherein said laser beam source is mounted on the movable die assembly for travel therewith, and wherein one of said laser beam sensors is disposed adjacent the stationary die assembly.

9. A laser-operated hole presence and absence inspector, according to claim 4, wherein an additional scrap removal passageway is disposed in said lower die assembly with its upper end communicating with one of said laser beam passageways.

10. A laser-operated hole presence and absence inspector, according to claim 9, wherein said scrap removal passageway is inclined downward, and wherein the lower portion thereof is directed toward scrap disposal means.

* * * * *